Patented Apr. 7, 1925.

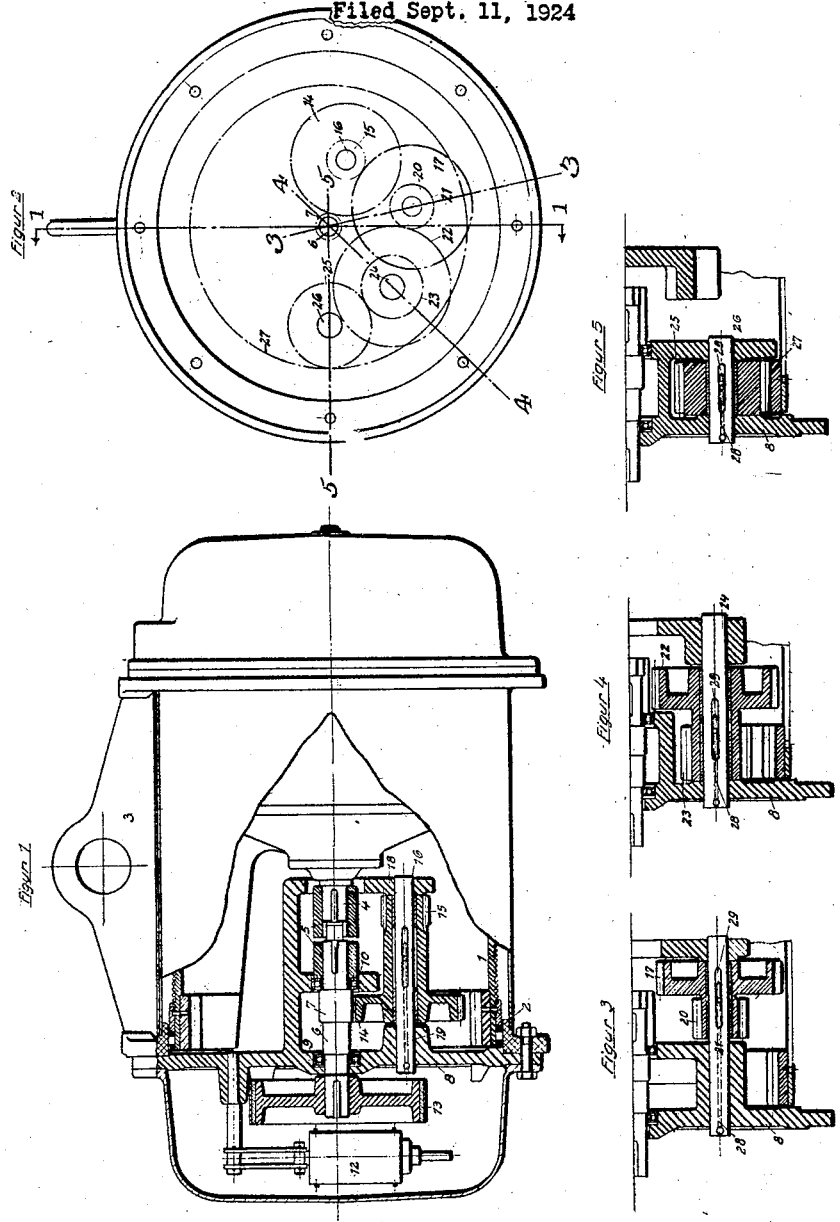

1,532,899

UNITED STATES PATENT OFFICE.

FRIEDRICH HOLTSCHMIT, OF DUISBURG, GERMANY.

TOOTHED GEARING FOR DRIVING THE DRUM OF PULLEY BLOCKS.

Application filed September 11, 1924. Serial No. 737,166.

*To all whom it may concern:*

Be it known that I, FRIEDRICH HOLTSCHMIT, a citizen of the German State, residing at 215 Dusseldorferstrasse, Duisburg, Germany, have invented a certain new and useful Toothed Gearing for Driving the Drum of Pulley Blocks (for which I have filed applications for patents in Germany, June 22, 1923; Germany, August 13, 1923), of which the following is a specification.

In electrically driven pulley blocks it is known to provide the whole drive within the load drum. As, however, by reason of the small space available, only a limited gear ratio was possible, it was necessary to drive the mechanism by means of particularly slow-running motors, which were very expensive to produce.

Furthermore, in order to be able to use high-speed motors, that is, motors of the usual type of construction, the gear ratio has been increased by the use of sun and planet gear wheels. In this case, however, other disadvantages have to be taken into consideration, as this type of drive is very expensive to produce and requires the most careful attention. Furthermore the mechanism makes a very disturbing clatter when the sun and planet gear is running at high speeds.

Thus, it has always been the endeavour to secure the necessary gear ratio by the use of simple spur wheel gears. For this purpose an extra shaft was provided parallel to the main shaft disposed on the center axis of the drum, and toothed wheels were provided upon both shafts in a sufficiently large number. The power was transmitted from one shaft to the other and back again according to the number of gear wheels employed. Here again the total gear ratio was insufficient. As the pressure on the gear wheel teeth increases, so must the pitch between the pairs of gear wheels be likewise increased and consequently the number of teeth is correspondingly reduced, that is, according to the distance the parallel shafts are placed apart a low total gear ratio is obtained whether a small or a larger number of separate gears is provided. The distance between the two shafts is limited by the small space available within the drum.

Thus it has always been necessary to dispose the main gear outside the drum by means of spur wheels or the like, and to provide within the drum only a portion of the necessary gears as well as the drum driving mechanism itself.

This gave an unprepossessing appearance to the pulley block, and in addition thereto the gearing outside the drum was easily damaged.

Furthermore, in all these constructions there is the disadvantage common to the construction as a whole and to the separate parts of the gearing that the gearing can be dismantled only by the withdrawal of each gear element and it can only be assembled within the drum.

The present invention has for its object to secure a transmission of high gear ratio in the use of simple spur wheels, and at the same time to provide the gear parts in their entirety within the drum in such manner that they can be readily assembled and dismantled and occupy the smallest possible space within the drum.

The problem was solved by mounting the shafts of the spur wheels forming the transmission gearing disposed around the main driving shaft disposed within the drum.

By such means not only are the inconveniences in the known construction hereinbefore referred to avoided, but the space available within the drum is completely made use of. The whole transmission needs only a very small portion of the space within the drum. The remaining space may be used for other useful purposes.

According to the invention the gearing is mounted upon the cover plate which closes the drum in such manner as to form with the cover plate a single unit, that is as a complete constructional element. Thus the gearing may be readily exchanged and replaced at all times, but the most important advantage is in the manufacture. It is thus now possible to have the gearing tested and reset. A further advantage is that every wheel shaft may be supported at both ends.

It will be readily apparent that the safety of operation of the gearing is considerably increased as compared with the gears in which the wheel shafts are mounted at one end only. With a view to facilitating the supply of lubricant from the outside, the shafts of the separate wheels are arranged stationary and the wheels loosely mounted upon the shafts.

One construction of apparatus according to the invention for use on an electrically driven pulley block is illustrated by way of example in the accompanying diagrammatic drawings, in which—

Fig. 1 is a side elevation, partly in section, on the line 1—1 of Fig. 2, showing an apparatus embodying my invention;

Fig. 2 is an end view of the apparatus, looking from left to right in Fig. 1, the outer cap and parts external to the end piece of the casing being omitted and the gears within the casing being indicated in dotted lines;

Fig. 3 is a section on the line 3—3 of Fig. 2;

Fig. 4 is a section on the line 4—4 of Fig. 2; and,

Fig. 5 is a section on the line 5—5 of Fig. 2.

The drum 1 is mounted on bearings in the two rings 2, which are connected together and on which the carrying eyelet 3 is provided. Within the drums (on the right-hand side) there is provided the driving motor, the shaft 4 of which is coupled to shaft 6 of the gearing by the coupling 5. Shaft 6 carries a pinion 7 and is mounted on both sides thereof in ball bearings 9 and 10 in the cover plate 8. The brake magnet 12 is suspended from and outside the cover plate 8 and the brake drum 13 is mounted upon the shaft 6. The driving pinion 7 engages with the toothed wheel 14, which is integral with pinion 15 and is loosely mounted to rotate upon the shaft 16. This shaft is likewise supported, upon both sides of the wheels 14 and 15, at 18 and 19 in the cover plate 8. The pinion 15 engages with the toothed wheel 17, which is integral with the pinion 20 and is loosely mounted to rotate upon the shaft 21. This shaft 21 is (as shown in Fig. 3) fixedly mounted on both sides of the wheels 17 and 20 in the cover plate 8. The pinion 20 engages with the wheel 22 (see Figs. 2 and 4), which is integral with the pinion 23 and is mounted upon the shaft 24. The pinion 23 is in engagement with the intermediate wheel 25 mounted upon the shaft 26. The wheel 25 transmits motion to the integrally toothed wheel 27 of the drum 1. The shafts 24 and 26 are likewise fixed and are similarly mounted in a similar manner to the shafts 16 and 21 in the cover plate 8. By means of holes 28 and lubricating grooves 29 in the shafts 16, 21, 24 and 26 lubricant is fed to the several bearings.

The whole drive including the braking mechanism is thus mounted upon the cover plate 8, so that the whole gearing can be readily dismantled and assembled. It will, of course, be understood that the invention is not limited to the embodiment hereinbefore described for example the braking mechanism may be provided separate from the cover plate and likewise the number of the spur wheels utilized is of no consequence to the essential feature of the invention, which is concerned with the necessary gear ratio.

I claim:—

The combination with a casing and a drum rotatably mounted therein, said drum having an internal gear, of a removable end piece closing one end of the casing and having a shaft-supporting frame projecting into the interior of the drum, a drive shaft rotatably mounted in said frame at the axis of the drum, fixed gear shafts mounted in said end piece and frame and arranged about the drive shaft, said fixed shafts extending through the end piece and provided with oil holes external thereto, a pinion on the drive shaft, and a train of gearing on said fixed shafts connecting said pinion with said internal gear.

FRIEDRICH HOLTSCHMIT.